(12) United States Patent
Negron et al.

(10) Patent No.: US 10,686,892 B2
(45) Date of Patent: Jun. 16, 2020

(54) REMOTELY-HOSTED AUTO-DISCOVERY SERVICE

(71) Applicant: AirWatch LLC, Atlanta, GA (US)

(72) Inventors: Josue Negron, Dallas, TX (US); Jonathan Blake Brannon, Mableton, GA (US); Varun Murthy, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 1100 days.

(21) Appl. No.: 14/723,838

(22) Filed: May 28, 2015

(65) Prior Publication Data

US 2016/0352840 A1 Dec. 1, 2016

(51) Int. Cl.
*H04L 29/08* (2006.01)
*H04L 29/06* (2006.01)
*H04L 29/12* (2006.01)
*H04L 12/58* (2006.01)

(52) U.S. Cl.
CPC .......... *H04L 67/16* (2013.01); *H04L 63/0442* (2013.01); *H04L 63/083* (2013.01); *H04L 63/0823* (2013.01); *H04L 67/02* (2013.01); *H04L 51/02* (2013.01); *H04L 61/1511* (2013.01); *H04L 63/0272* (2013.01)

(58) Field of Classification Search
CPC . H04L 61/1511; H04L 61/6068; H04L 67/02; H04L 67/1097; H04L 67/16; H04L 67/42; H04L 51/00; H04L 51/02; H04L 63/0272; H04L 63/0442; H04L 63/0823; H04L 63/083

See application file for complete search history.

(56) References Cited

U.S. PATENT DOCUMENTS

2006/0167860 A1* 7/2006 Eliashberg ............. G06Q 30/06
2006/0248205 A1* 11/2006 Randle ................ H04L 63/0869 709/229

* cited by examiner

*Primary Examiner* — Michael C Lai
(74) *Attorney, Agent, or Firm* — Thomas | Horstemeyer, LLP

(57) ABSTRACT

Disclosed are various embodiments for a remotely-hosted auto-discovery service. An auto-discovery request received from a client device over a network can be accessed to identify a domain associated with the auto-discovery request. A digital certificate corresponding to the domain can be identified and a configuration file can be generated for a web server application that creates at least one virtual host for a uniform resource locator (URL) identified in the auto-discovery request. The digital certificate can be bound to the at least one virtual host to operate a secure connection with the client device. An enrollment response can be generated for communication to the client device over the network.

20 Claims, 9 Drawing Sheets

```
0  <VirtualHost *:80>
1      DocumentRoot /var/www/vhosts/enterpriseenrollment.{DOMAIN}/html
2      ServerName enterpriseenrollment.sales.enterprise.site
3      SSLProxyEngine ON
4      ProxyRequests ON
5      #ProxyHTMLEnable ON
6      RewriteEngine ON
7      RewriteOptions INHERIT
8      RewriteRule ^/enrollmentserver/(.*)
9         http://EnterpriseEnrollment.{DOMAIN}/EnrollmentServer/$1 [P]
10     RewriteRule ^/EnrollmentServer/(.*)
11        http://EnterpriseEnrollment.{DOMAIN}/EnrollmentServer/$1 [P]
12 </VirtualHost>
13 <VirtualHost *:443>
14     DocumentRoot /var/www/vhosts/EnterpriseEnrollment.{DOMAIN}/html
15     ServerName enterpriseenrollment.sales.enterprise.site
16     SSLProxyEngine ON
17     ProxyRequests ON
18     #ProxyHTMLEnable ON
19     RewriteEngine ON
20     RewriteOptions INHERIT
21     RewriteRule ^/enrollmentserver/(.*)
22        http://EnterpriseEnrollment.{DOMAIN}/EnrollmentServer/$1 [P]
23     RewriteRule ^/EnrollmentServer/(.*)
24        http://EnterpriseEnrollment.{DOMAIN}/EnrollmentServer/$1 [P]
25     SSLEngine ON
26        SSLCertificateFile /etc/httpd/certs/endpoint.site.crt
27        SSLCertificateKeyFile /etc/httpd/certs/endpoint.site.decrypted.key
28        SSLCertificateChainFile /etc/httpd/certs/endpoint.site.root.crt
29 </VirtualHost>
```

Lines 8–11 marked 155a; lines 21–24 marked 155b; figure labeled 300.

FIG. 3

REMOTELY-HOSTED AUTO-DISCOVERY SERVICE

BACKGROUND

Various e-mail server applications may include an auto-discovery feature that simplifies an enrollment of a client device with the e-mail server. The auto-discovery feature can return system settings to the client device after a user enters only his or her e-mail address and password. Previously, the user may have had to enter other information, such as internet protocol (IP) addresses, post office protocol (POP) settings, server settings, and other settings that may be unknown to the user. However, for an e-mail server application to include the auto-discovery feature, an e-mail server must be installed on-premises with a dedicated IP address and a digital certificate. The digital certificate must be unique and correspond to a single domain.

Some auto-discovery applications employ the secure sockets layer (SSL) protocol to provide a secure connection between a client application (e.g., a web browser) and network content (e.g., websites). SSL certificates are issued by a certificate authority after an identity of an entity applying for the certificate has been verified. When a client application requests a secure connection to a particular domain, the client application retrieves a digital certificate for the domain, determines whether the digital certificate has expired, and determines whether the domain matches a domain specified in the digital certificate. If the digital certificate is invalid or has expired, a secure connection will not be established.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 is a drawing of a configuration file for a web server application generated to create virtual hosts according to various examples.

DETAILED DESCRIPTION

Figure 1A:
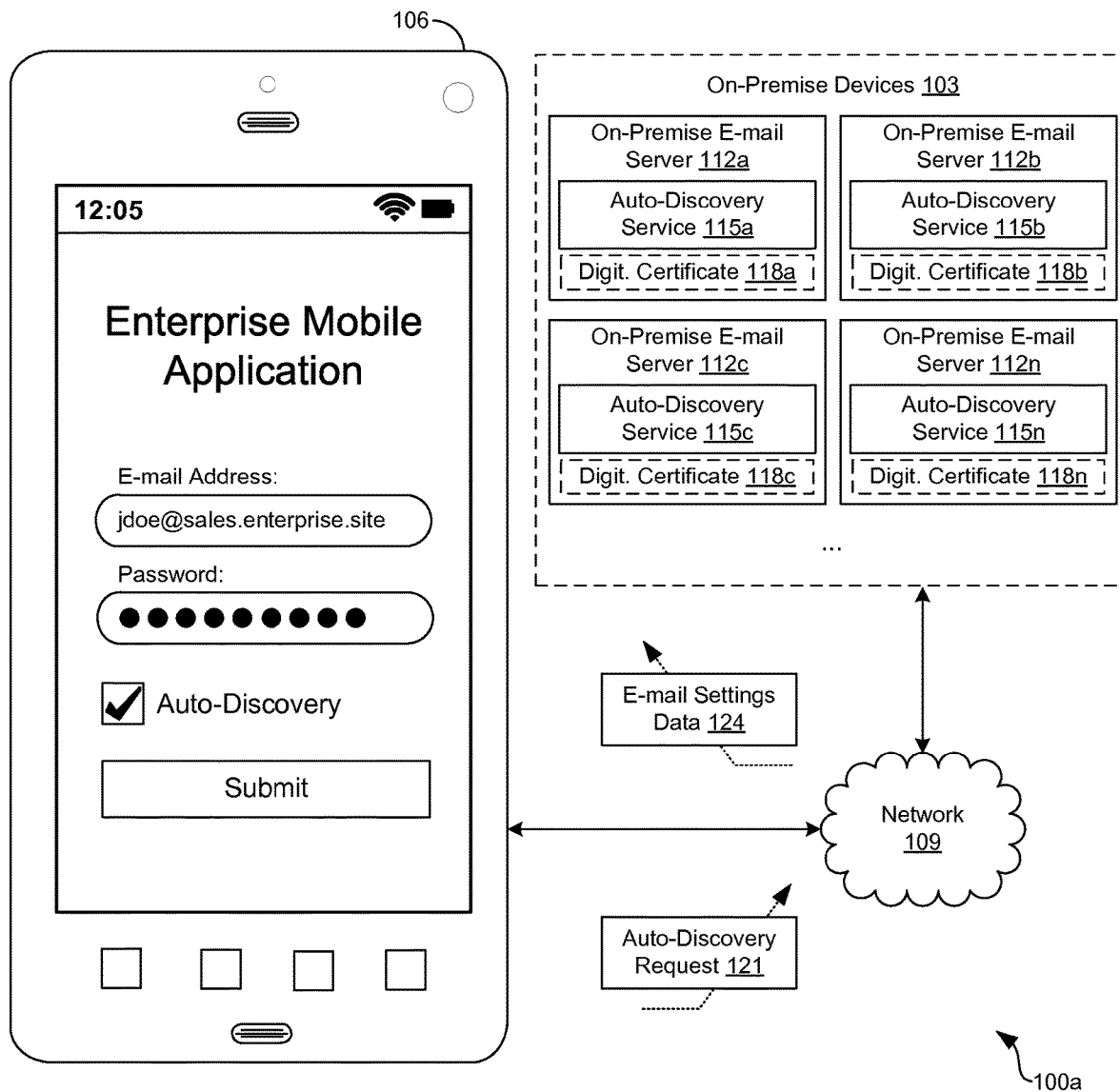
FIG. 1A is a drawing of a networked environment utilizing on-premise devices for auto-discovery according to various examples.

The present disclosure relates to a remotely-hosted auto-discovery service. As noted above, various e-mail server applications may include an auto-discovery feature that simplifies an enrollment of a client device by returning system settings to the client device after a user enters only his or her e-mail address and password. Previously, the user may have had to enter other information, such as internet protocol (IP) addresses, post office protocol (POP) settings, server settings, or other settings that are unknown to the user. However, for an e-mail server application to include the auto-discovery feature for various platforms, an e-mail server typically must be installed on-premises with a dedicated IP address and a digital certificate. The digital certificate must often be unique and correspond to a single domain.

As a result, an enterprise having multiple domains or sub-domains for e-mail would be required to establish an on-premise e-mail server for each domain or sub-domain for which the enterprise desires to offer auto-discovery. For example, assuming an enterprise desired to offer auto-discovery to simplify enrollment of client devices with an e-mail service for all sub-domains operated by the enterprise, e.g., jdoe1@support.enterprise.site, jdoe2@sales.enterprise.site, jdoe3@marketing.enterprise.site, the enterprise would be required to have a server, IP address, and digital certificate for "support.enterprise.site," another server with its own IP address and digital certificate for "sales.enterprise.site," and yet another server with its own IP address and digital certificate for "marketing.enterprise.site." As enterprises can have hundreds to thousands of domains or sub-domains, the infrastructure and support costs of hosting these e-mail servers on-premises can become difficult to manage.

Moreover, client devices can execute various operating systems or client applications that perform auto-discovery in different ways. For example, some client applications attempt to contact a predefined URL when performing auto-discovery. If a user attempts to perform auto-discovery for the e-mail address "jdoe@sales.enterprise.site," the client applications may attempt to contact a preconfigured server name of "enterpriseenrollment" that is located within the domain of the e-mail address (e.g., "https://enterpriseenrollment.sales.enterprise.site/enrollmentserver/discovery.svc"). Moreover, the client applications expect certain results from the auto-discovery service, such as URLs that, when accessed, provide a certificate policy, a device root certificate, and/or client configurations. As the predefined URL cannot be modified and because the client applications require results in a predefined format, supporting auto-discovery for many domains remains problematic.

Examples of this disclosure employ a remote computing environment to provide remotely-hosted auto-discovery services for multiple domains or sub-domains, thereby reducing the infrastructure costs required to support auto-discovery on-premises. The remote computing environment can access an uploaded digital certificate for a domain and validate the digital certificate. The remote computing environment can also perform remote storage of the digital certificate. A domain name system (DNS) record traditionally associated with an on-premise enterprise enrollment server can be changed to point to an IP address of the remote computing environment. Examples of DNS records that can be changed include a canonical name (CNAME) record and an address record, also referred to as an A record. As a result, the remote computing environment can receive auto-discovery requests from client devices attempting to perform auto-discovery instead of, or in addition to, the on-premise server.

Further, the remote computing environment can be configured to examine an auto-discovery request to identify a domain included within the auto-discovery request. For example, if a user attempts to perform auto-discovery with an e-mail address jdoe@support.enterprise.site, the domain identified in the request can include "support.enterprise.site." In response to the auto-discovery request, the remote computing environment can create a virtual host for the identified domain and bind a digital certificate for the domain to the virtual host. As a result, a Hypertext Transfer Protocol Secure (HTTPS) connection can be created with an appropriate digital certificate. The remote computing environment can provide suitable responses to a client device to complete the auto-discovery process.

With reference to FIG. 1A, shown is a networked environment 100a that facilitates on-premise auto-discovery according to various examples. The networked environment 100a includes a plurality of on-premise devices 103 and a client device 106 which are in data communication over a network 109. The on-premise devices 103 can include one or more on-premise e-mail servers 112a . . . 112n (collectively on-premise e-mail servers 112) on which auto-discovery services 115a . . . 115n (collectively auto-discovery services 115) are executed.

As noted above, for some e-mail server applications to support auto-discovery, the e-mail servers 112 must be installed on-premises. In some implementations, on-premise devices 103 are installed and running on the premises of an organization using the devices, rather than at a remote facility or a cloud computing environment. For domains served by an enterprise, a traditional configuration requires each of the domains to have its own on-premise e-mail server 112. This on-premise e-mail server 112 also implements its own auto-discovery service 115 and dedicated IP address. Additionally, the on-premise e-mail server 112 stores a digital certificate 118 corresponding to the domain.

In FIG. 1A, a respective one of the on-premise devices 103 receives an auto-discovery request 121 from the client device 106 based on the domain (e.g., "sales.enterprise.site") within the auto-discovery request 121. For example, one of the on-premise e-mail servers 112 having the digital certificate for "sales.enterprise.site" can access the auto-discovery request 121 to provide e-mail settings data 124 to the client device 106. As enterprises can have hundreds to thousands of domains or sub-domains, the infrastructure and support costs of hosting these on-premise e-mail servers 112 can be significant.

Figure 1B:
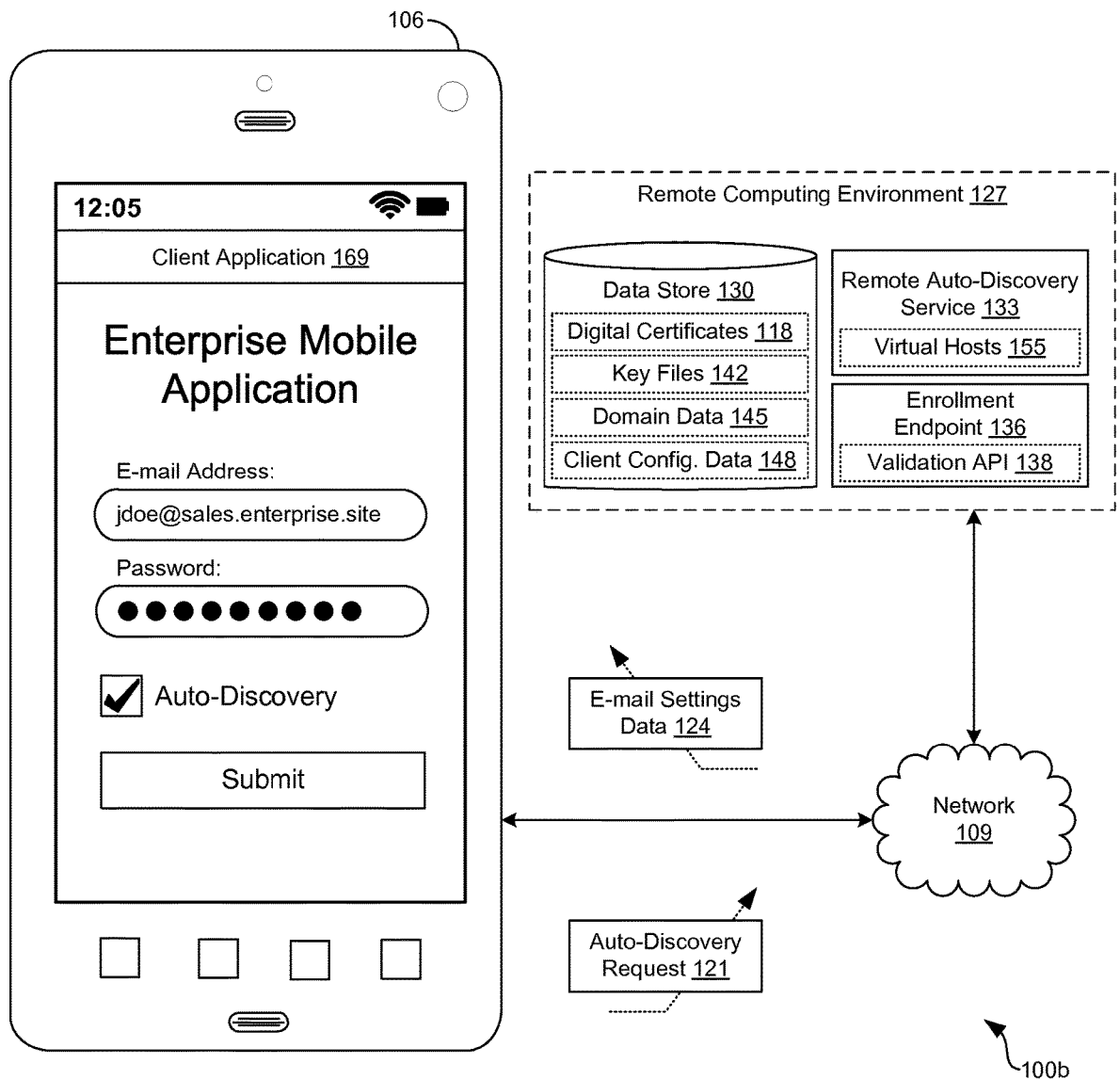
FIG. 1B is a drawing of a networked environment utilizing a remote computing environment for auto-discovery according to various examples.

With reference to FIG. 1B, shown is a networked environment 100b that facilitates remotely-hosted auto-discovery according to various examples. The networked environment 100b can include a remote computing environment 127 and a client device 106 which are in data communication over a network 109. The network 109 can include, for example, the Internet, one or more intranets, extranets, wide area networks (WANs), local area networks (LANs), wired networks, wireless networks, other suitable networks, or any combination of two or more such networks. For example, networks can include satellite networks, cable networks, Ethernet networks, telephony networks, and other types of networks.

The remote computing environment 127 can include, for example, a server computer or any other system providing computing capability. Alternatively, the remote computing environment 127 can include a plurality of computing devices that are arranged, for example, in one or more server banks or computer banks or other arrangements. For example, the remote computing environment 127 can include a grid computing resource and/or any other distributed computing arrangement. The computing environment 109 can also include or be operated as one or more virtualized computer instances. The computing devices can be located in a single installation or can be distributed among many different geographical locations. For purposes of convenience, the remote computing environment 127 is referred to herein in the singular. However, it is understood that a plurality of computing environments can be employed in the various arrangements as described above.

Various applications and/or other functionality can be executed in the remote computing environment 127. Also, various data is stored in a data store 130 that is accessible to the remote computing environment 127. The data store 130 can include memory of the remote computing environment 127, mass storage resources of the remote computing environment 127, or any other storage resources on which data can be stored by the remote computing environment 127. The data store 130 can also be representative of a plurality of data stores 130.

The components executed by the remote computing environment 127, for example, include a remote auto-discovery service 133, and an enrollment endpoint 136. Generally, the remote auto-discovery service 133 can provide e-mail settings data 124, enrollment data, or other data to a client device 106 in response to receiving an auto-discovery request 121 from the client device 106. Further, the remote auto-discovery service 133 can present multiple digital certificates 118 on the same IP address and port number, which allows multiple secure connections (e.g., HTTPS) to be served using the same IP address. The enrollment endpoint 136 can validate digital certificates 118 provided by enterprise administrators or other suitable users. Additionally, the enrollment endpoints can return certificate policies, device root certificates, e-mail settings data 124, enrollment data, client configuration data, or other data to the client device 106 in response to an appropriate request. In some examples, the validation of the digital certificates 118 is performed using a validation application programming interface (API) 138.

The data stored in the data store 130 can include digital certificates 118, key files 142, domain data 145, client configuration data 148, and potentially other data. Digital certificates 118 include electronic documents that prove ownership of a connection using a public or private key. In various embodiments, the digital certificates 118 can include transport layer security (TLS) certificates or secure sockets layer (SSL) certificates. To this end, the digital certificates 118 can include X.509 certificates or other suitable certificates. An X.509 certificate is a digital certificate 118 that uses the X.509 public key infrastructure standard to verify that a public key belongs to a computer or service identity contained within the digital certificate 118. Although several examples of digital certificates have been given, others types of digital certificates can also be used.

The key files 142 can include a file generated when the digital certificate 118 is created that includes a private key. The key files 142 may be used to bind a digital certificate 118 to a virtual host 155. The domain data 145 can include information associated with a domain or a sub-domain registered with the remote auto-discovery service 133. The domain data 145 can include a location of the digital certificates 118 and/or key files 142 associated with a particular domain, such as a hostname or a URL for a corresponding enrollment endpoint 136. The client configuration data 148 can include settings that are used to configure the client device 106 during enrollment.

The client device 106 is representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can include a display that can be a liquid crystal display (LCD) displays or other types of display devices. The client device 106 can also be equipped with networking capability or networking interfaces, including a localized networking or communication capability, such as an NFC capability, RFID read or write capability, a microphone or speaker, or other localized communication capability.

The client device 106 can execute various applications, such as a client application 169 and/or other applications. The client application 169 can access network content served up by the remote computing environment 127 or other servers, thereby rendering a user interface on the display. To this end, the client application 169 can include a browser or a dedicated application, and the user interface can include a network page, an application screen, or other user interface. The client device 106 can execute applications beyond the client application 169 such as management applications, enterprise applications, social networking applications, word processors, spreadsheet applications, or other applications. Further, the client application 169 can generate auto-discovery requests 121 for communication to the remote computing environment 127.

Next, a general description of the operation of the various components of the networked environment 100b is provided. To begin, the enrollment endpoint 136 can manage the upload and storage of digital certificates 118 provided by administrators or other suitable users. A validation engine or the validation API 138 can validate the digital certificate 118. The enrollment endpoint 136 can perform a validation of a digital certificate 118 to determine whether it corresponds to a domain specified by an administrator when the digital certificate 118 is uploaded. If the digital certificate 118 is validated (e.g., the digital certificate 118 corresponds to the specified domain), the digital certificate 118 can be stored in the data store 130 for future retrieval. In addition, a mapping of the digital certificate 118 to a particular domain can be stored in the data store 130. The mapping of the digital certificate 118 can be used to identify enrollment URLs or other information, as discussed in further detail below.

The client application 169 can provide a user with information to enroll the client device 106 with a management service, e-mail service, or other suitable service. The client application 169 can prompt the user to provide at least an e-mail address to generate an auto-discovery request 121. The auto-discovery request 121 can be generated to obtain e-mail settings data 124, enrollment data, or other data from the remote auto-discovery service 133 with which the client device 106 can be automatically configured. In some embodiments, the auto-discovery request 121 includes authentication credentials, such as a password, a personal identification number, biometric data, or other suitable information.

The e-mail address provided by the user can be described as having a domain (e.g., "enterprise.site") and/or a sub-domain (e.g., "sales.enterprise.site"). In some situations, to perform auto-discovery, the client application 169 attempts to contact a predefined URL associated with the domain and/or the sub-domain. For example, if a user attempts to perform auto-discovery with the e-mail address "jdoe@enterprise.site," the client application 169 will attempt to access discovery settings from the URL "https://enterpriseenrollment.enterprise.site/enrollmentserver/discovery.svc." More specifically, in one example, the client application 169 can construct a URL by appending the sub-domain "enterpriseenrollment" to the domain of the email address and by appending the path "/enrollmentserver/discovery.svc." For example, if the email address is "jdoe@support.enterprise.site," the resulting URL would be "http://enterpriseenrollment.support.enterprise.site/enrollmentserver/discovery.svc."

As the URL constructed by the client application 169 is incapable of customization on some platforms, a DNS record for the domain of the URL can be modified for the respective domain to point to an IP address of the remote computing environment 127. For example, a DNS record for "enterpriseenrollment" associated with the domain of "enterprise.site" can be updated to the IP address of the remote computing environment 127. As a result, the remote computing environment 127 receives the auto-discovery request 121 instead of an on-premise device 103.

As the remote computing environment 127 receives the auto-discovery request 121 from the client device 106, the remote computing environment 127 can identify a domain included within the auto-discovery request 121. For example, if auto-discovery is being performed for an e-mail address "jdoe@support.enterprise.site," the domain identified in the request includes "support.enterprise.site." Next, the remote computing environment 127 dynamically creates a virtual host 155 for the identified domain that binds a digital certificate 118 corresponding to the domain to the virtual host 155. As a result, a valid HTTPS connection can be established with the client device 106 using an appropriate digital certificate 118 for the domain. The client application therefore 169 perceives that it is accessing an on-premise service located at the predefined URL, which may be incapable of customization. However, the client application 169 is actually accessing a virtual host 155 created by the remote computing environment 127.

The remote computing environment 127 can provide suitable responses to the client device 106 to complete the auto-discovery process. This can include receiving multiple requests from the client application 169 as well as providing suitable responses to those requests. For example, in response to the client application 169 making a POST request to "discovery.svc" over the HTTPS protocol, a response can be provided that includes an enrollment service URL and an authentication policy. The enrollment service URL specifies the URL of the enrollment endpoint 136 determined by the remote auto-discovery service 133. The client application 169 can then make a subsequent call to the enrollment service URL after the user has been authenticated. The authentication policy indicates a type of authentication required by the remote auto-discovery service 133.

The response can be generated in a format compatible with the client application 169. In various embodiments, the response can be served to the client device 106 as an extensible markup language (XML) document. In alternative embodiments, the response can be served to the client device 106 as a POST or GET response under the HTTP protocol, depending on the request.

The functionality of the remote auto-discovery service 133, the enrollment endpoint 136, and/or other services of the remote computing environment 127 can be implemented by a web server application, such as Apache®. In some examples the functionality is performed by a servlet in an Apache® Tomcat® environment. With respect to the Apache® Tomcat® environment, the servlet can be implemented in JAVA®. Further, the remote computing environment 127 can utilize server name indication (SNI) to present multiple certificates on the same IP address and port number, thereby allowing multiple secure (HTTPS) websites to be served using the same IP address without requiring all of the secure websites to use the same certificate.

Figure 2:
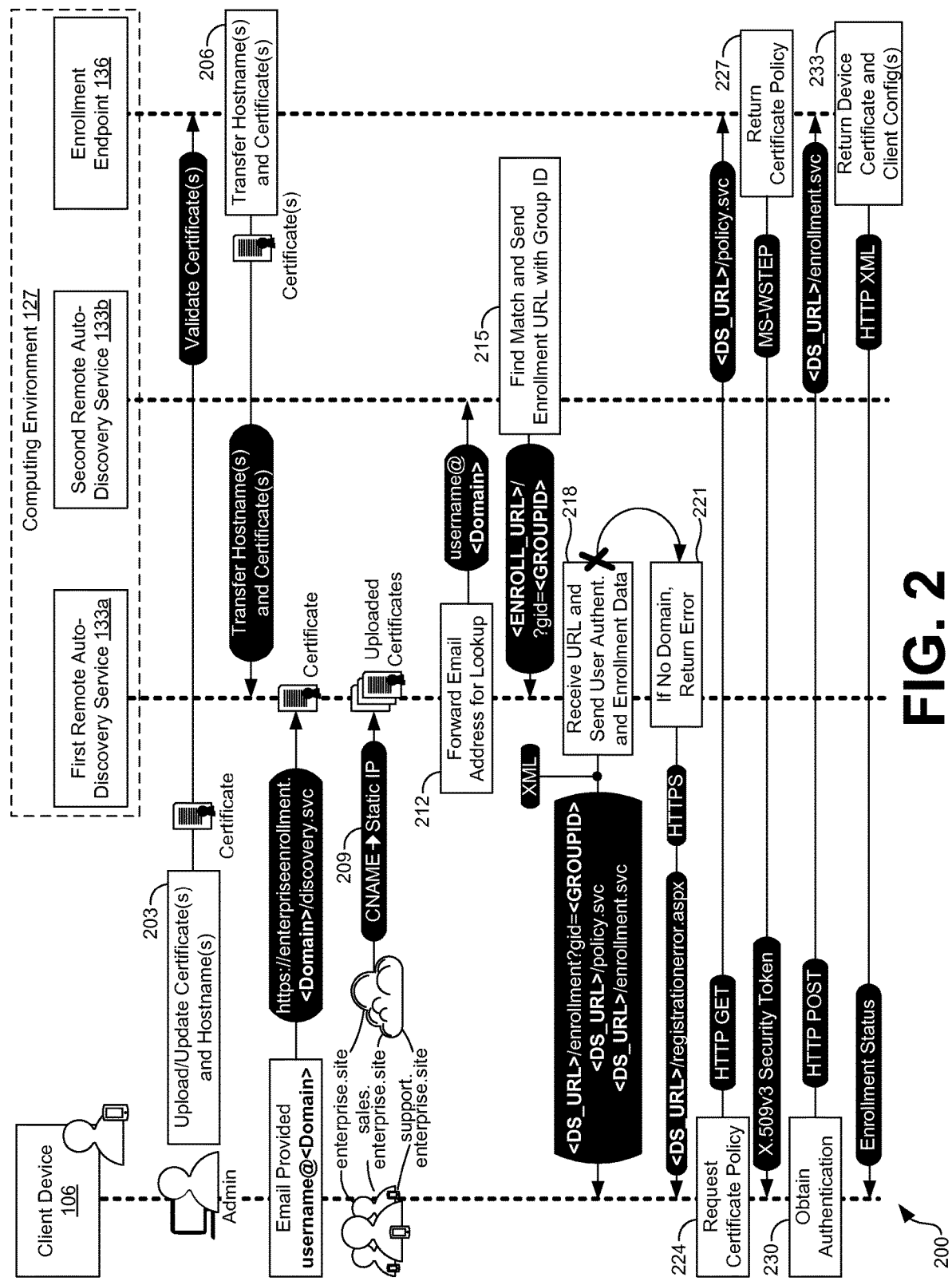
FIG. 2 is a flow diagram illustrating the functionality of the remote computing environment of FIG. 1B according to various examples.

Moving on to FIG. 2, shown is a flow diagram 200 describing the functionality of the networked environment 100b according to various examples. In the example of FIG. 2, the functionality of the remote auto-discovery service 133 can be managed by multiple remote auto-discovery services 133 (e.g., by a first remote auto-discovery service 133a and/or a second auto-discovery service 133b). However, the functionality of these services can be implemented in a single service or application in some examples. In FIG. 2, the first auto-discovery service 133a can be used to manage auto-discovery requests 121 originating from a first client platform (e.g., Microsoft Windows®), while the second auto-discovery service 133b can be used to manage auto-discovery requests 121 originated from a second client platform (e.g., iOS® and/or Android®). This architecture can be beneficial when different platforms have different levels of customizability. The separation or segmentation of functionality as discussed herein is presented for illustrative purposes only.

Before auto-discovery is supported for a particular domain, the enrollment endpoint 136 can require a receipt of a digital certificate 118 for the particular domain. In step 203, the digital certificate 118 can be provided by an administrator for validation by the validation API 138 to determine whether it corresponds to the particular domain. By validating digital certificates 118 at their upload, the remote computing environment 127 can prevent attempted HTTPS connections from having invalid digital certificates 118. If the digital certificate 118 is validated by the enrollment endpoint 136, the enrollment endpoint 136 can manage the storage and retrieval of the digital certificate 118 from the data store 130. In addition, a mapping of the digital certificate 118 to a particular domain can be stored in the data store 130 for access by the first remote auto-discovery service 133a and/or the second remote auto-discovery service 133b.

Next, in step 206, the enrollment endpoint 136 can transfer or otherwise communicate a digital certificate 118 for a particular domain to the first remote auto-discovery service 133a for local storage. This can be useful when the first remote auto-discovery service 133a handles auto-discovery requests 121 made from platforms incapable of customizing the URL for the initial auto-discovery request 121. For example, if a platform attempts to seek discovery settings from "https://enterpriseenrollment.enterprise.site/enrollmentserver/discovery.svc," the digital certificate 118 for the sub-domain "enterpriseenrollment.enterprise.site" can be cached in the first remote auto-discovery service 133a for repeated access.

After a digital certificate 118 is uploaded by an administrator, a DNS record for the domain or sub-domain associated with the digital certificate 118 is updated to point to an IP address of the first remote auto-discovery service 133a or the second remote auto-discovery service 133b in step 209. For example, if the digital certificate 118 is uploaded for "https://enterpriseenrollment.enterprise.site," a CNAME record for "enterpriseenrollment.enterprise.site" can be updated to point to the hostname or IP address associated with the first remote auto-discovery service 133a. Multiple domains can point to the same hostname or IP address of the first remote auto-discovery service 133a, as it is capable of handling auto-discovery requests 121 received from different domains.

When an auto-discovery request 121 is received by the first remote auto-discovery service 133a, in step 212, the e-mail address or the domain within the e-mail address can be forwarded or otherwise communicated to the second remote auto-discovery service 133b to identify a corresponding entry in the data store 130. If an entry in the data store 130 matches the domain within the e-mail address, a suitable response can be generated based at least in part on the platform (e.g., Windows®, iOS®, Android®) of the client device 106 generating the auto-discovery request 121. For example, an enrollment URL and/or a group identifier corresponding to the domain can be located and communicated to the first remote auto-discovery service 133a to generate the suitable response in step 215. The enrollment URL can include a URL for the enrollment endpoint 136 where subsequent enrollment requests and/or auto-discovery requests 121 can be directed.

If the first remote auto-discovery service 133a receives the enrollment URL, the group identifier, or any data required to generate an accurate response to the auto-discovery request 121 based on the requesting platform, a response can be generated in a suitable format and communicated to the client device 106 in step 218. For example, an XML document comprising user authentication data, an enrollment policy, or enrollment service URLs can be generated by the first remote auto-discovery service 133a. The enrollment service URLs can include, for example, a group enrollment URL (e.g., "https://<DS_URL>/devicemanagement/enrollment?gid=<GROUPID>"), an enrollment policy service URL (e.g., "https://<DS_URL>/deviceservices/policy.svc"), and an enrollment service URL (e.g., "https://<DS_URL>/deviceservices/enrollment.svc"), where <GROUPID> is an identifier for a group or an enterprise and <DS_URL> is a URL for discovery services. In various examples, the URL for the discovery services can be a URL corresponding to the enrollment endpoint 136.

The client application 169 can utilize the enrollment service URLs received in the response to make subsequent queries to complete the auto-discovery process. If the data required to generate an accurate response to the auto-discovery request 121 is unavailable, an error message can be returned to the client device 106 in step 221. In various embodiments, the error response can be communicated to the client device 106 under the HTTPS protocol.

When the client application 169 has confirmation of user authentication, an enrollment policy, and enrollment service URLs, the client application 169 can utilize the enrollment service URLs to complete the auto-discovery process. For example, the client application 169 can request a certificate policy in step 224 by contacting the enrollment endpoint 136 to obtain a certificate policy using the HTTP GET protocol at the enrollment policy service URL (e.g., "https://<DS_URL>/deviceservices/policy.svc"). In return, the enrollment endpoint 136 can respond by returning the certificate policy (e.g., a X.509v3 security token) in step 227.

Additionally, in step 230, the client application 169 can obtain authentication information by prompting the user of the device for a username, password, or other information and provide such information to the enrollment endpoint 136 under the HTTP POST protocol. In response to an authentication of the user, the enrollment endpoint 136, in step 233, can respond with a device root certification, client configuration data, e-mail settings data 124, or other suitable data. Upon receipt of the data, the client device 106 completes enrollment and can be described as having an enrolled status.

Turning now to FIG. 3, shown is an exemplary configuration file 300 that can create a virtual host 155 for a domain identified in an auto-discovery request 121 and that can bind a digital certificate 118 for the domain to the virtual host 155. In various examples, the configuration file 300 can be generated dynamically in response to receipt of an auto-discovery request 121. For example, an auto-discovery request 121 can be examined to identify a domain within an e-mail address. A query can be performed in the data store 130 to identify a corresponding digital certificate 118 for the domain as well as a list of URLS that are mapped to the domain. If a copy of the digital certificate 118 is not stored locally on the remote computing environment 127, a copy of the digital certificate 118 and a corresponding key file and chain file can be copied from the data store 130 to local memory. For example, the digital certificate 118, the key file, and the chain file can be stored in the "/etc/httpd/certs/" directory or other suitable directly of the remote computing environment 127. Next, the virtual hosts 155 can be dynamically created in the configuration file 300. As an example, embodiments where the remote auto-discovery service 133 is implemented by Apache®, the configuration file 300 can be saved as "httpd-vhosts.conf," which is a configuration file 300 that creates one or more virtual hosts 155 on an Apache® framework.

In one example, a first virtual host 155a can be created for port 80 and a second virtual host 155b can be created for port 443, as port 80 is the most common port used by the HTTP protocol and 443 is the port commonly used by the HTTPS protocol. As a result, the remote auto-discovery service 133 can handle requests made under both protocols. In some embodiments, a virtual host 155 is only created for port 443 to handle requests made under only the HTTPS protocol. The variable "ServerName" in the configuration file 300 (e.g., lines 2 and 15) can be provided with a value that matches a hostname in a HTTP header of the auto-discovery request 121. For example, if an auto-discovery request 121 is generated for the e-mail "jdoe@sales.enterprise.site," the auto-discovery request 121 can be made to "https://enterpriseenrollment.sales.enterprise.site/enrollmentserver/discovery.svc." If a CNAME record for "https://enterpriseenrollment.sales.enterprise.site" has been changed to point to an IP address of the remote auto-discovery service 133, the virtual hosts 155 can recognize requests from "https:// enterpriseenrollment.sales.enterprise.site." Accordingly, the "ServerName" can be set to "enterpriseenrollment. sales.enterprise.site" to accommodate the auto-discovery request 121.

The remote auto-discovery service 133 can modify the {DOMAIN} value under the rewrite rule as well as the certificate values for the second virtual host listening on port 443 (e.g., SSL). In various examples, the configuration file 300 can be generated to include rewrite rules (e.g., lines 6-11 and 19-24) that determine whether the auto-discovery request 121 includes a predefined word, phrase, or pattern in the URL (e.g., "enrollmentserver" or "EnrollmentServer" in the URL") and, if so, the URL is rewritten to proxy content from another server. The locations of the digital certificate 118, as well as a corresponding key file and chain file, are updated to locations of the files stored locally by the remote auto-discovery service 133. Although the configuration file 300 of FIG. 3 has been described as one example, other configuration methods can also be used.

Figure 4A:
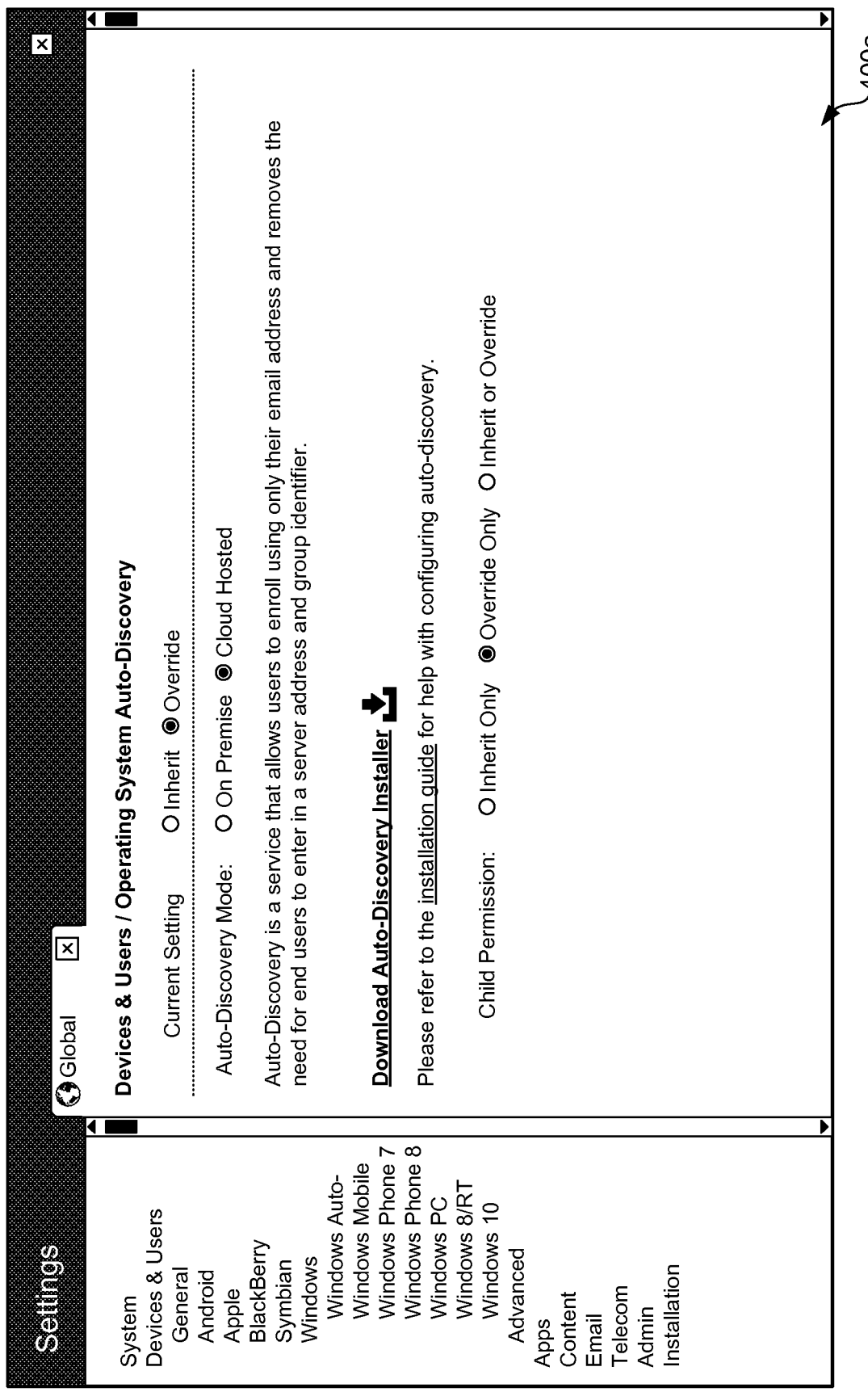
FIGS. 4A-4D are drawings of user interfaces for configuring the remote auto-discovery service according to various examples.

Moving on to FIG. 4A, shown is a non-limiting example of a user interface 400a generated by the remote computing environment 127 to facilitate configuration of the remote auto-discovery service 133. Through the user interface 400a of FIG. 4A, an administrator can specify whether auto-discovery for a predefined platform (e.g., Android®, Windows®, or Apple®) is performed on-premises or remotely using the remote auto-discovery service 133 (e.g., cloud hosted).

Figure 4B:
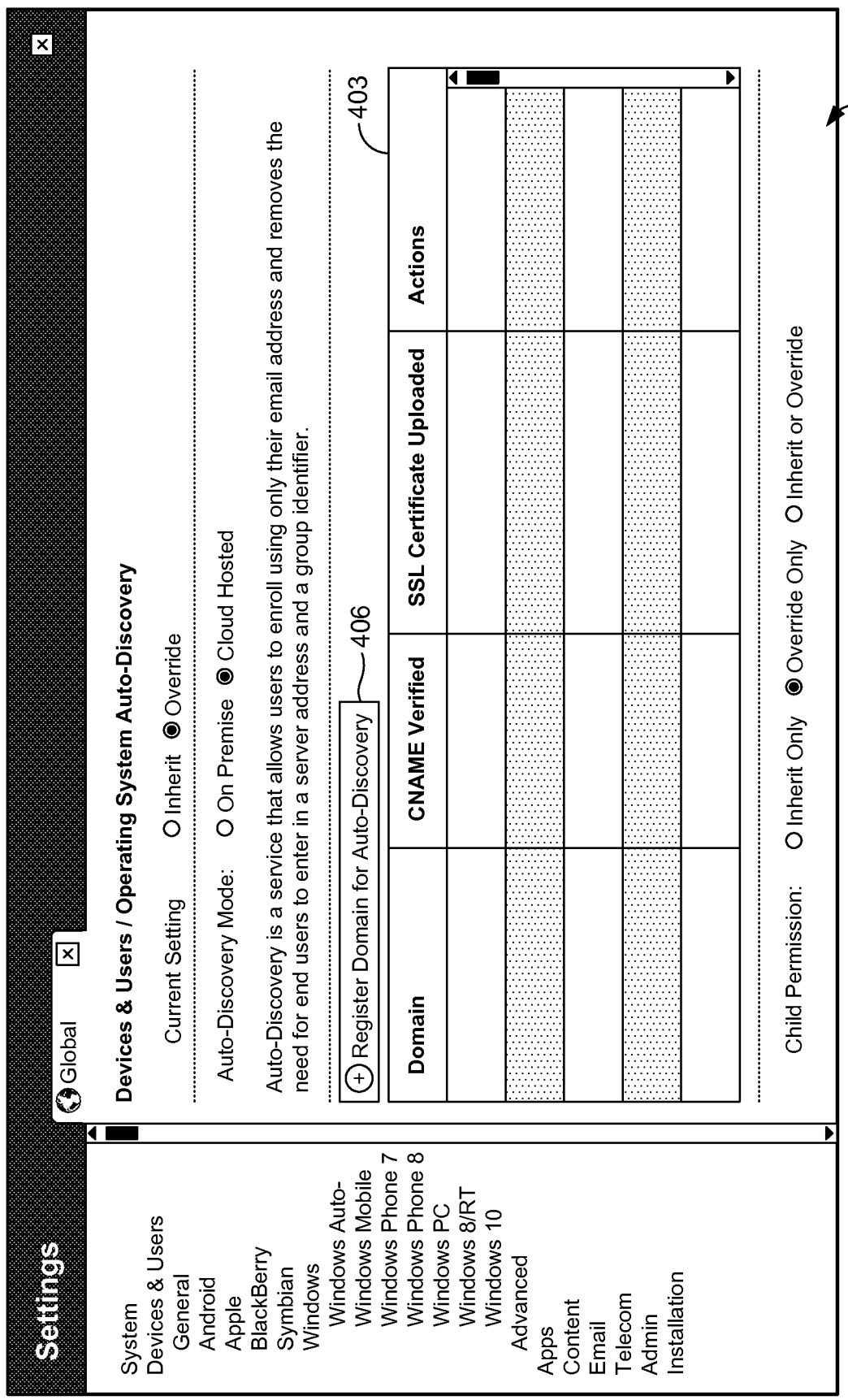

Assuming the administrator desires to use the remote auto-discovery service 133, in FIG. 4B, a user interface 400b can be presented to show domains registered by the administrator to be handled by the remote auto-discovery service 133. In various examples, the domains can be shown in a table 403, a list, or other suitable user interface component. By selecting or otherwise manipulating a "register domain for auto-discovery" component 406, the administrator can add a domain to the table 403. One or more additional user interfaces 400 can be presented to facilitate registration of a domain for the remote auto-discovery service 133.

Figure 4C:
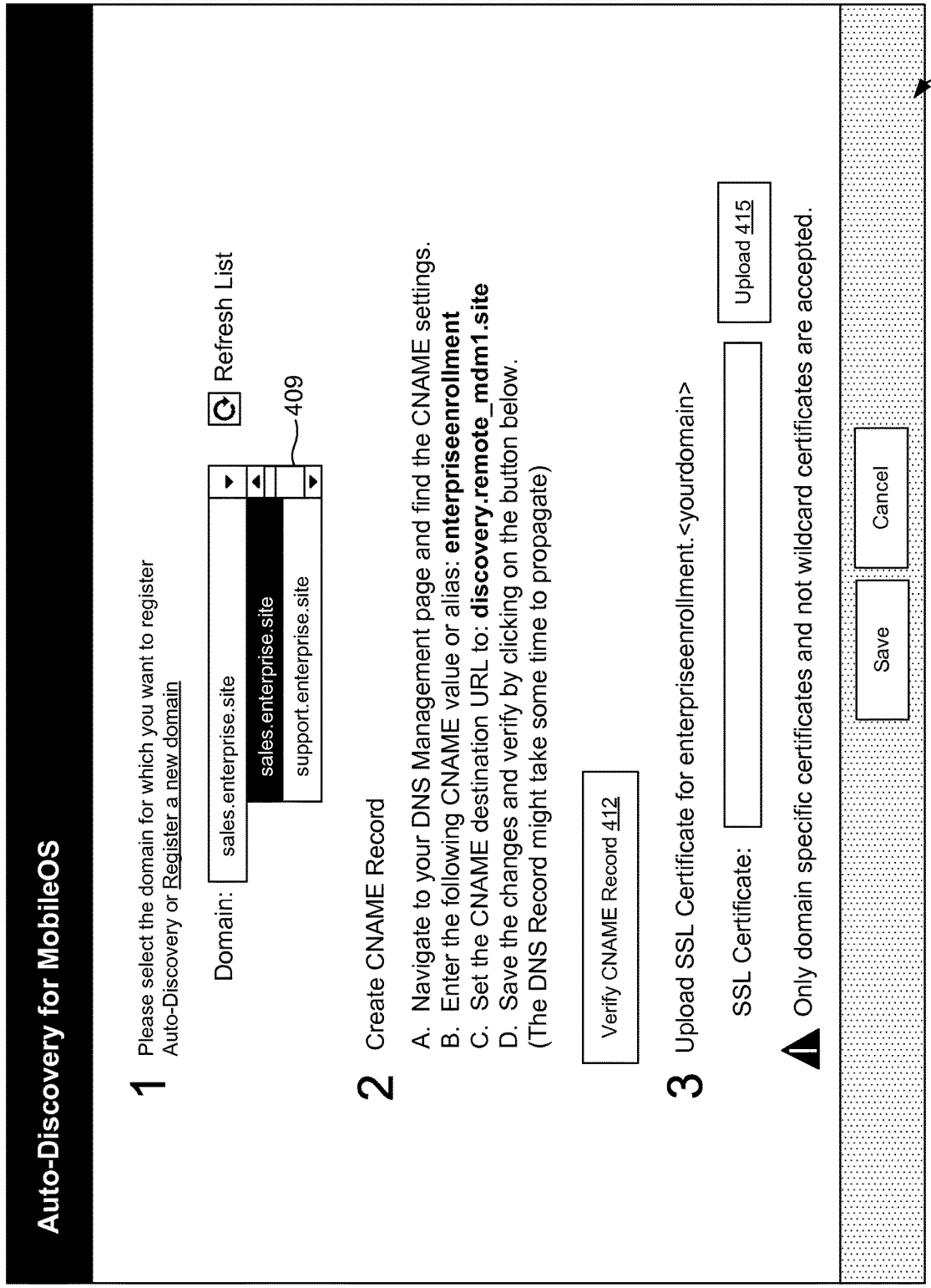

For example, in FIG. 4C, a user interface 400c can be generated that allows an administrator to select a domain from a dropdown component 409 for which the administrator desired to enroll in the remote auto-discovery service 133. As a platform of the client device 106 can cause a client application 169 to contact a URL for an on-premise device 103 when performing an auto-discovery request 121, the user interface 400c facilitates creation of a DNS record that maps the URL for the on-premise device 103 to the remote auto-discovery service 133. For example, if a user attempts to perform auto-discovery for the e-mail address of "jdoe@sales.enterprise.site," the "MobileOS" platform can attempt to make a discovery request to "https://enterpriseenrollment.sales.enterprise.site/enrollmentserver/discovery. svc." Accordingly, the administrator can be directed to update the DNS record for "enterpriseenrollmenet. sales.enterprise.site" to a URL or IP address for the remote auto-discovery service 133 (e.g., "discovery.remote_ mdm1.site"). The DNS record can also be updated automatically using a script or other techniques.

In various examples, a DNS record, such as a CNAME record, can be verified by selecting the "verify CNAME record" component 412 in the user interface 400c. Verification can include performing domain name system (DNS) queries and/or attempting to simulate a discovery request from a client device 106 and determining whether the CNAME record points to the remote auto-discovery service 133. The user interface 400c can include an upload component 415 that facilitates an upload of a digital certificate 118 for the domain to the remote computing environment 127. In various examples, the upload component 415 facilitates navigation of a mounted drive to locate and select a digital certificate 118 for upload to the remote computing environment 127.

Figure 4D:
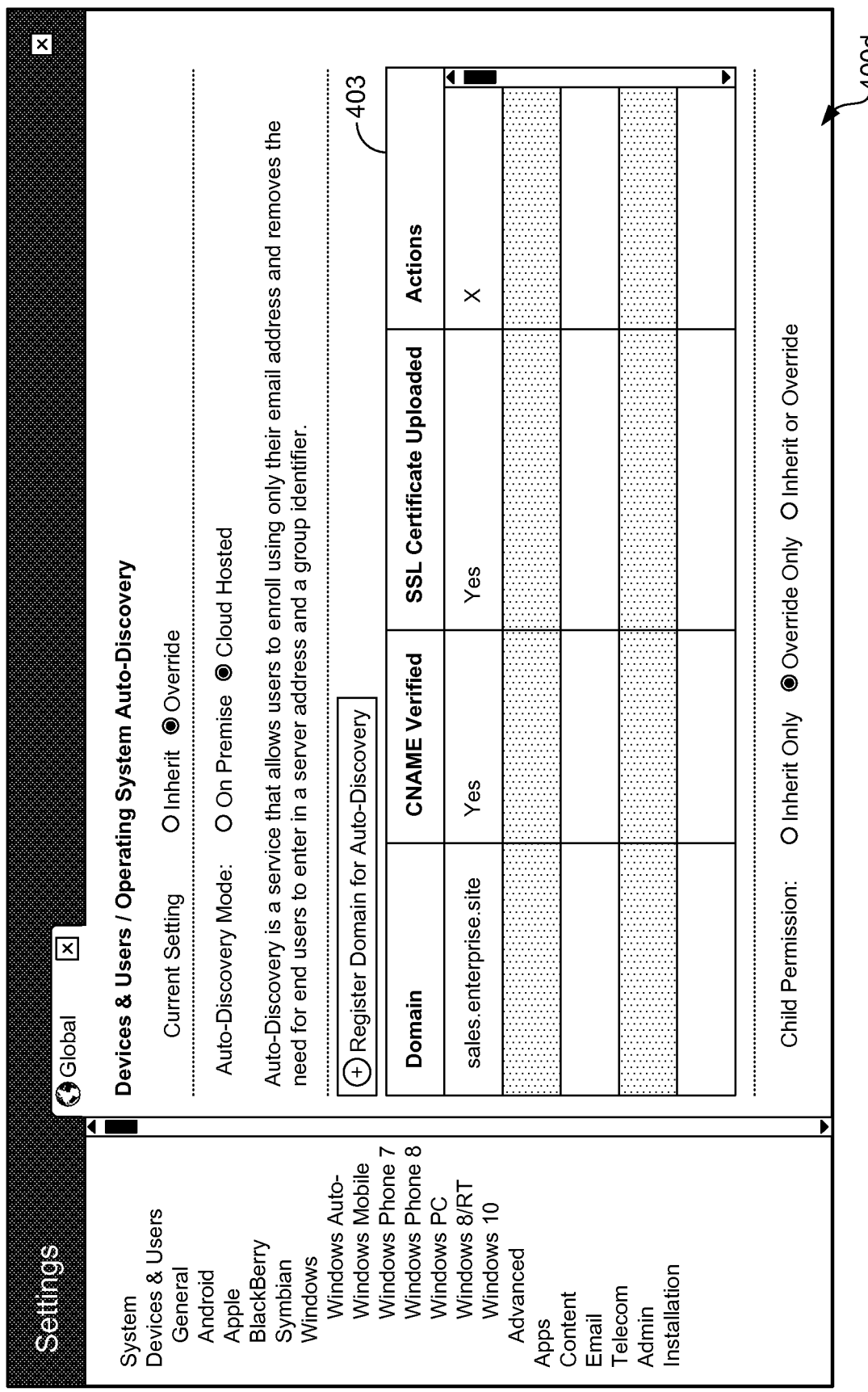

After a digital certificate 118 is uploaded for a domain, the table 403 in the user interface 400d of FIG. 4D can be updated to reflect the added domain. In various embodiments, a selection or other manipulation of a row in the table 403 can facilitate a modification of the data in the row. For example, a row can be selected to change the domain, verify a CNAME record for the domain, upload a digital certificate 118, or perform other similar actions.

Figure 5:
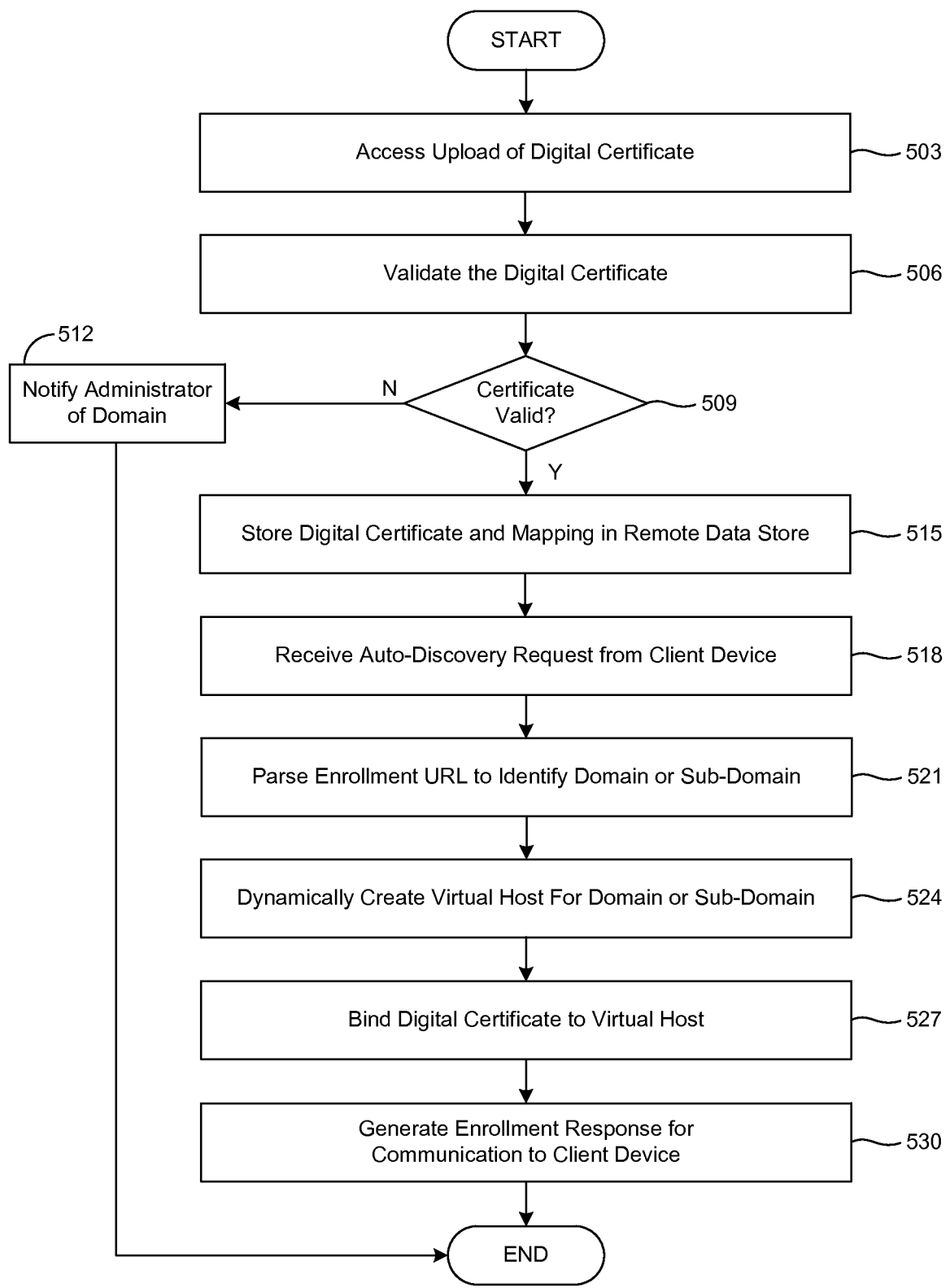
FIG. 5 is a flowchart illustrating functionality implemented by components executed in the networked environment of FIG. 1B according to various examples.

Referring next to FIG. 5, shown is a flowchart that provides one example of the operation of a portion of the remote computing environment 127. As an alternative, the flowchart of FIG. 5 can be viewed as depicting an example of elements of a method implemented by at least one remote auto-discovery service 133 or enrollment endpoint 136 according to one or more embodiments. The separation or segmentation of functionality as discussed herein is presented for illustrative purposes only.

Before auto-discovery is supported for a particular domain, the remote computing environment 127 can require receipt of a digital certificate 118 for a particular domain. Accordingly, in step 503, a digital certificate 118 can be accessed. In various examples, the digital certificate 118 can be uploaded by an administrator for the particular domain. Then, in step 506, the digital certificate 118 can be validated to determine whether it corresponds to the particular domain. By validating digital certificates 118 at their upload, the remote computing environment 127 can prevent attempted HTTPS connections that have invalid digital certificates 118.

In step 509, it can be determined whether the digital certificate 118 is valid for the particular domain. Determining whether the digital certificate 118 is valid can include using a public key for a certification authority to verify that the digital certificate 118 was signed by the certificate authority. Although a digital certificate 118 is issued by a certificate authority by signing the digital certificate 118 with a private key, the remote computing environment 127 can validate an authenticity of the digital certificate 188 using a public key for the certificate authority.

If the certificate is not valid, the process proceeds to step 512 where an administrator of the domain can be notified or other suitable remedial action can be performed. Accordingly, the administrator can upload another digital certificate 118 for the domain for validation. Thereafter, the process proceeds to completion. Alternatively, if the digital certificate 118 is validated by the remote computing environment 127, the process proceeds to step 515 where the remote computing environment 127 stores the digital certificate 118 in the data store 130. In addition, a mapping of the digital certificate 118 to a corresponding domain can be stored in the data store 130 for access by the remote auto-discovery service 133 or the enrollment endpoint 136.

After a digital certificate 118 is validated, a DNS record for the domain or sub-domain associated with the digital certificate 118 can be updated to point to a hostname or an IP address of the remote computing environment 127. For example, if the digital certificate 118 was uploaded for "https://enterpriseenrollment.enterprise.site," the DNS record for "enterpriseenrollment.enterprise.site" can be updated to point to the hostname or IP address associated with the remote auto-discovery service 133. As a result, the enterprise is not required to have an on-premise device 103 capable of handling auto-discovery requests 121. Further, multiple domains are able point to the same hostname or IP address of the remote auto-discovery service 133, as it is capable of handling auto-discovery requests 121 received for different domains.

Next, in step 518, the remote computing environment 127 receives an auto-discovery request 121. In step 521, using the auto-discovery request 121, the remote computing environment parses an enrollment URL from a header of the request to identify a domain or sub-domain. Assuming a user desires to perform auto-discovery for the email address of "jdoe@sales.enterprise.site," the client device 106 can generate a POST or GET request for a URL of "http://enterpriseenrollment.sales.enterprise.site/enrollmentserver/discovery.svc." Within the header of the auto-discovery request 121, the remote computing environment 127 can identify the domain of "enterprise.site" and/or the sub-domain of "sales.enterprise.site."

In response to the auto-discovery request 121, in step 524, the remote computing environment 127 can dynamically create one or more virtual hosts 155 to manage a secure connection with the requesting client device 106 using the domain and/or sub-domain. The one or more virtual hosts 155 can be created by dynamically generating a configuration file 300 for a web server application (e.g., Apache®), or by accessing a configuration file and/or add new entries to the configuration file. A query can be performed in the data store 130 to identify a corresponding digital certificate 118 for the domain and/or sub-domain in the request, as well as a list of enrollment URLS that are mapped to the domain and/or sub-domain. If a copy of the digital certificate 118 is not stored locally on the remote computing environment 127, a copy of the digital certificate 118 and a corresponding key file and chain file can be copied from the data store 130 to local memory of the remote computing environment 127. For example, the digital certificate 118, the key file, and the chain file, can be stored in the "/etc/httpd/certs/" directory of the remote computing environment 127. In step 527, the digital certificate 118 can be bound to the one or more virtual hosts 155. In some examples, the remote computing environment 127 can be configured to generate the virtual hosts 155 without requiring a restart of the remote computing environment 127 or the remote auto-discovery service 133. In examples where the remote auto-discovery service 133 is implemented by Apache®, the configuration file 300 can be saved as the "httpd-vhosts.conf" configuration file 300.

In step 530, a suitable response to the auto-discovery request 121 can be generated based at least in part on the platform (e.g., Windows®, iOS®, Android®) of the client device 106 generating the auto-discovery request 121. For example, an enrollment URL and/or a group identifier corresponding to the domain can be located and communicated to the remote auto-discovery service 133 to generate the suitable response. The enrollment URL can include a URL for the enrollment endpoint 136 where subsequent enrollment requests and/or auto-discovery requests 121 can be directed.

The response can include one or more enrollment URLs, a group identifier, user authentication data, and/or other data to generate an accurate response to the auto-discovery request 121 based on the requesting platform. The response can be formatted as an XML document. The enrollment URLs can include, for example, a group enrollment URL (e.g., "https://<DS_URL>/devicemanagement/enrollment?gid=<GROUPID>"), an enrollment policy service URL (e.g., "https://<DS_URL>/deviceservices/policy.svc"), and an enrollment service URL (e.g., "https://<DS_URL>/deviceservices/enrollment.svc"), where <GROUPID> is an identifier for a group or an enterprise and <DS_URL> is a URL for discovery services. The URL for the discovery services can be a URL of the enrollment endpoint 136.

The client application 169 can utilize the enrollment service URLs received in the response to make subsequent queries to complete the auto-discovery process. As the client application 169 can obtain confirmation of user authentication, an enrollment policy, or enrollment service URLs, the client application 169 can utilize the enrollment service URLs to complete the auto-discovery process. For example, the client application 169 can contact the enrollment endpoint 136 to obtain a certificate policy under the HTTP GET protocol through the enrollment policy service URL (e.g., "https://<DS_URL>/deviceservices/policy.svc"). In return, the enrollment endpoint 136 can respond with the certificate policy (e.g., a X.509v3 security token).

Additionally, the client application 169 can prompt the user of the device for a username, password, or other information and provide that information to the enrollment endpoint 136 under the HTTP POST protocol. In response to an authentication of the user, the enrollment endpoint 136 can respond with a device root certification, client configuration data, e-mail settings data 124, or other suitable data. Upon receipt of the data, the client device 106 completes enrollment and can be described as having an enrolled status.

The client devices 106 or devices comprising the remote computing environment 127 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 169, and potentially other applications. Also stored in the memory can be a data store 130 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display upon which a user interface generated by the client application 169 or another application can be rendered. The client device 106 can also include one or more input/output devices that can include, for example, a capacitive touchscreen or other type of touch input device, fingerprint reader, or keyboard.

Although the remote auto-discovery service 133, the client application 169, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A non-transitory computer-readable medium embodying a program executable in at least one computing device comprising at least one hardware processor, the program, when executed by the at least one computing device, being configured to cause the at least one computing device to:
   access an auto-discovery request received from a client device over a network to identify a domain associated with the auto-discovery request;
   identify a digital certificate from a data store corresponding to the domain;
   access a configuration file for a web server application that creates at least one virtual host for a uniform resource locator (URL) identified in the auto-discovery request, the digital certificate being bound to the at least one virtual host to operate a secure connection with the client device; and
   generate an enrollment response for communication to the client device over the network.

2. The non-transitory computer-readable medium of claim 1, wherein the program, when executed by the at least one computing device, is further configured to cause the at least one computing device to access an upload of the digital certificate to validate the digital certificate for the domain prior to storage in the data store.

3. The non-transitory computer-readable medium of claim 1, wherein the domain associated with the auto-discovery request is identified based at least in part on an e-mail address associated with the client device.

4. The non-transitory computer-readable medium of claim 1, wherein the enrollment response comprises at least one enrollment URL and a group identifier.

5. The non-transitory computer-readable medium of claim 1, wherein the auto-discovery request is received from the client device based at least in part on a domain name system (DNS) record that points to an internet protocol (IP) address of the at least one computing device.

6. The non-transitory computer-readable medium of claim 5, wherein the program, when executed by the at least one computing device, is further configured to cause the at least one computing device to verify that the DNS record points to the IP address of the at least one computing device.

7. The non-transitory computer-readable medium of claim 1, wherein the web server application employs the configuration file to create the at least one virtual host without a restart of the at least one computing device.

8. A computer-implemented method, comprising:
   accessing an auto-discovery request received from a client device over a network to identify a domain associated with the auto-discovery request;
   identifying a digital certificate from a data store corresponding to the domain;
   accessing a configuration file for a web server application that creates at least one virtual host for a uniform resource locator (URL) identified in the auto-discovery request, the digital certificate being bound to the at least one virtual host to operate a secure connection with the client device; and
   generating an enrollment response for communication to the client device over the network.

9. The computer-implemented method of claim 8, further comprising accessing an upload of the digital certificate to validate the digital certificate for the domain prior to storage in the data store.

10. The computer-implemented method of claim 8, wherein the domain associated with the auto-discovery request is identified based at least in part on an e-mail address associated with the client device.

11. The computer-implemented method of claim 8, wherein the enrollment response comprises at least one enrollment URL and a group identifier.

12. The computer-implemented method of claim 8, wherein the auto-discovery request is received from the client device based at least in part on a domain name system (DNS) record that points to an internet protocol (IP) address of a remote auto-discovery service.

13. The computer-implemented method of claim 12, further comprising verifying that the DNS record points to the IP address of at least one computing device.

14. The computer-implemented method of claim 8, wherein the web server application employs the configuration file to create the at least one virtual host without a restart of the web server application.

15. A system, comprising:
   at least one computing device in data communication with a client device over a network; and
   program code that, when executed by the at least one computing device, causes the at least one computing device to:
      access an auto-discovery request received from the client device over the network to identify a domain associated with the auto-discovery request;
      identify a digital certificate from a data store corresponding to the domain;
      access a configuration file for a web server application that creates at least one virtual host for a uniform resource locator (URL) identified in the auto-discovery request, the digital certificate being bound to the at least one virtual host to operate a secure connection with the client device; and
      generate an enrollment response for communication to the client device over the network.

16. The system of claim 15, further comprising program code that, when executed by the at least one computing device, causes the at least one computing device to access an upload of the digital certificate to validate the digital certificate for the domain prior to storage in the data store.

17. The system of claim 15, wherein the domain associated with the auto-discovery request is identified based at least in part on an e-mail address associated with the client device.

18. The system of claim 15, wherein the enrollment response comprises at least one enrollment URL and a group identifier.

19. The system of claim 15, wherein the auto-discovery request is received from the client device based at least in part on a domain name system (DNS) record that points to an internet protocol (IP) address of a remote auto-discovery service.

20. The system of claim 19, further comprising program code that, when executed by the at least one computing device, causes the at least one computing device to verify that the DNS record points to the IP address of the at least one computing device.

* * * * *